(12) United States Patent
Hu et al.

(10) Patent No.: US 8,390,589 B2
(45) Date of Patent: Mar. 5, 2013

(54) TOUCH SCREEN DEVICES EMPLOYING NANOSTRUCTURE NETWORKS

(75) Inventors: Liangbing Hu, Mountain View, CA (US); George Gruner, Los Angeles, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 12/813,799

(22) Filed: Jun. 11, 2010

(65) Prior Publication Data

US 2011/0080355 A1    Apr. 7, 2011

Related U.S. Application Data

(63) Continuation of application No. 11/552,834, filed on Oct. 25, 2006, now abandoned.

(51) Int. Cl.
*G09G 5/00* (2006.01)

(52) U.S. Cl. ..... 345/173; 345/174; 345/176; 178/18.01; 178/18.03

(58) Field of Classification Search .......... 345/173–179; 315/169.1–169.4; 178/18.01–18.09
See application file for complete search history.

(56) References Cited

U.S. PATENT DOCUMENTS

| | | | | |
|---|---|---|---|---|
| 6,706,552 B2 * | 3/2004 | Getz et al. | ..... | 438/100 |
| 7,535,462 B2 * | 5/2009 | Spath et al. | ..... | 345/174 |
| 7,593,004 B2 * | 9/2009 | Spath et al. | ..... | 345/174 |
| 7,796,123 B1 * | 9/2010 | Irvin et al. | ..... | 345/173 |
| 2003/0234769 A1 * | 12/2003 | Cross et al. | ..... | 345/173 |
| 2010/0127241 A1 * | 5/2010 | Gruner et al. | ..... | 257/20 |

OTHER PUBLICATIONS

Bekyarova et al., *J. Am. Chem. Soc.* 127:5990-5995 (2005).
Glatkowski, "Carbon Nanotube Based Transparent Conductive Coatings," at http://www.eikos.com/articles/conductive_coatings.pdf (last visited Oct. 27, 2006).
Kaempgen et al., *Applied Surface Science* 252:425-429 (2005).

* cited by examiner

*Primary Examiner* — Quan-Zhen Wang
*Assistant Examiner* — Jennifer Nguyen
(74) *Attorney, Agent, or Firm* — Harness, Dickey & Pierce, P.L.C.

(57) ABSTRACT

Touch screen displays comprising at least one nanostructure-film, and fabrication methods thereof, are discussed. Nanostructure-films may comprise, for example, a network(s) of nanotubes, nanowires, nanoparticles and/or graphene flakes. Such films are preferably at least semi-transparent and relatively flexible, making them well-suited for use in a variety of touch screen applications.

19 Claims, 7 Drawing Sheets

| 310 | Transparent substrate |
|---|---|
| 320 | NT network |
| 330 | Spacer layer |
| 320 | NT network |
| 310 | Transparent substrate |

| 310 | Transparent substrate |
|---|---|
| 320 | NT network |
| 330 | Spacer layer |
| 320 | NT network |
| 310 | Transparent substrate |

FIG. 4

| 310 | Transparent substrate |
|---|---|
| 320 | NT network |
| 330 | Spacer layer |
| 410 | Polymer conducting |
| 310 | Transparent substrate |

R: reflection
T: transmittance
A: absorption.

FIG. 8

TOUCH SCREEN DEVICES EMPLOYING NANOSTRUCTURE NETWORKS

This application is a continuation of U.S. patent application Ser. No. 11/552,834, filed Oct. 25, 2006, which claims priority to U.S. Provisional Patent Application No. 60/836,966, filed Aug. 11, 2006, and entitled "FABRICATION OF LARGE AREA HIGHLY CONDUCTING NANOSTRUCTURE FILMS," both of which are hereby incorporated herein by reference.

COPYRIGHT & TRADEMARK NOTICE

A portion of the disclosure of this patent document contains material that is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and shall not be construed as descriptive or limit the scope of this invention to material associated only with such marks.

FIELD OF THE INVENTION

The present invention relates in general to a touch screen display, and more particularly to a touch screen display comprising at least one nanostructure-film.

BACKGROUND OF THE INVENTION

Touch screens are display overlays which are typically either pressure-sensitive (resistive), electrically-sensitive (capacitive), acoustically-sensitive (surface acoustic wave (SAW)) and/or photo-sensitive (infra-red). The effect of such overlays is to allow a display to be used as an input device, with such displays often attached to computers and/or networks. Currently, the most popular touch screen systems are resistive and/or capacitive.

A typical resistive display consists of a transparent glass panel covered with a conductive and resistive metallic layer. These two layers are separated by an array of insulating spacers, and an electrical current runs through the two layers while the display is operational. When a user touches the glass panel, the two layers make contact at an underlying point. The resulting change in the electrical field at that point is detected and the coordinates of the point are calculated by a computer. Resistive touch screen displays are generally the most affordable, but offer only 75% clarity and the transparent layer can be easily damaged by sharp objects.

In a typical capacitive system, a layer that stores electrical charge is placed on the glass panel of a display. When a user touches the display, a charge is transferred to the user, and the overall charge on the capacitive layer decreases. This decrease is detected by circuits located in the display (e.g., in the four corners), allowing a computer to calculate the point of contact. One advantage of capacitive displays is that they generally allow for greater light transmission than resistive systems, resulting in a much clearer picture in the former than in the latter.

Thus, it is apparent that a good transparent conductive material is key in both resistive and capacitive touch screen displays. Currently, the most common such materials are transparent conducting oxides (TCOs), specifically Indium-tin-oxide (ITO) on glass. However, ITO can be an inadequate solution for many emerging applications (e.g., touch screens given that ITO is relatively brittle), and the Indium component of ITO is rapidly becoming a scarce commodity. Hence, a more robust and abundant transparent conductor is required.

SUMMARY OF THE INVENTION

It is therefore an object of the present invention to provide a nanostructure-film for use as a transparent conductive material. Specifically, a touch screen display with a nanostructure-film electrode(s) is provided. Such nanostructure-films include, but are not limited to, networks of nanotubes, nanowires, nanoparticles and/or graphene flakes.

In accordance with one embodiment of the present invention, a touch screen display comprising transparent single-walled carbon nanotube (SWNT) electrodes is provided. Transparent conducting films composed of randomly distributed SWNTs have been demonstrated as substantially more mechanically robust than ITO films, making them ideal for high-reliability touch screens and flexible displays. Moreover, carbon is one of the most abundant elements on Earth.

As used herein, a layer of material or a sequence of several layers of different materials is said to be "transparent" when the layer or layers permit at least 50% of the ambient electromagnetic radiation in relevant wavelengths to be transmitted through the layer or layers. Similarly, layers which permit some but less than 50% transmission of ambient electromagnetic radiation in relevant wavelengths are said to be "semi-transparent."

Devices according to embodiments of the present invention may have, for example, resistive and/or capacitive touch screen device architectures. That said, the present invention may be equally applicable to other touch screen device architectures employing a transparent conductive layer.

A resistive touch screen device architecture may comprise at least two conductive layers deposited respectively on transparent substrates. These coated transparent substrates are brought together such that the conductive layers face each other, and are separated by a spacer layer, which prevents contact between the conductive layers in the absence of external deformation. This spacer layer generally comprises and insulating material, and may take the form of, for example, microspheres.

At least one of the conductive layers may be formed from a network of nanostructures (e.g., SWNTs). A conductive layer may additionally or alternatively comprise another conducting material, such as a conducting polymer. This conducting material may form a distinct layer and/or may be combined with a network of nanostructures to form a composite layer, in both cases preferably filling open porosity in the nanostructure network.

At least one of the transparent substrates may be flexible, and coated with additional layers such as a hardcoat and/or an anti-Newton ring coating. Such flexible substrates include, but are not limited to, polyethylene terephthalate (PET), polyethylene naphthalate (PEN) and similar plastics.

A capacitive touch screen device architecture according to an embodiment of the present invention may comprise a network of nanostructures coated onto a transparent substrate, wherein the network of nanostructures stores an electric charge. The device may further comprise at least two circuits, wherein the circuits detect changes in capacitance across the network of nanostructures when the network of nanostructures is contacted by an external capacitance field. A computer may calculate a point of contact between the external capacitance field and the network of nanostructures based on a detection signal from the circuits.

Methods of fabricating the above-mentioned and other embodiments of the present invention comprise depositing first a network of nanostructures on a transparent substrate, wherein the network of nanostructures forms a conductive layer. Such methods may further comprise depositing a spacer layer on the conductive layer and affixing it to a second coated transparent substrate such that the conductive layers face each other and the spacer layer prevents contact between the conductive layers in the absence of external deformation.

Other features and advantages of the invention will be apparent from the accompanying drawings and from the detailed description. One or more of the above-disclosed embodiments, in addition to certain alternatives, are provided in further detail below with reference to the attached figures. The invention is not limited to any particular embodiment disclosed.

BRIEF DESCRIPTION OF THE DRAWINGS

The invention is better understood from reading the following detailed description of the preferred embodiments, with reference to the accompanying figures in which.

Features, elements, and aspects of the invention that are referenced by the same numerals in different figures represent the same, equivalent, or similar features, elements, or aspects in accordance with one or more embodiments of the system.

DETAILED DESCRIPTION OF THE INVENTION

Figure 1:
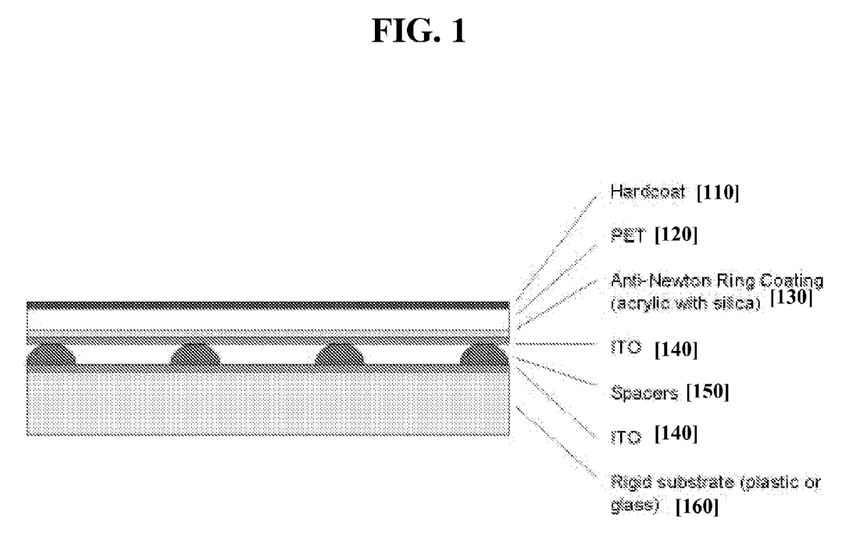
FIG. 1 is a schematic representation of a resistive touch screen display.

Referring to FIG. 1, a resistive touch screen display comprises a transparent substrate 160 (e.g., plastic or glass) covered with two transparent conductive layers 140 separated by an array of insulating spacers 150. The top transparent conductive layer is often covered by an anti-Newton ring coating 130 (e.g., acrylic with Silica) and packaged with a transparent plastic layer 120 (e.g., PET) and hardcoat 110.

While the display is operational, an electrical current runs through the two transparent conductive layers 140. When a user touches the display, e.g., by pushing down on the hardcoat, the layers above the spacers deform and the two transparent conductive layers 140 make contact at an underlying point. The resulting change in the electrical field at that point is detected and the coordinates of the point are calculated by a computer.

Although the transparent conductive layers most commonly consist of Indium-tin-oxide (ITO), ITO is relatively brittle and is therefore ill-suited for the constant deformation required in the above-described device.

Figure 2:
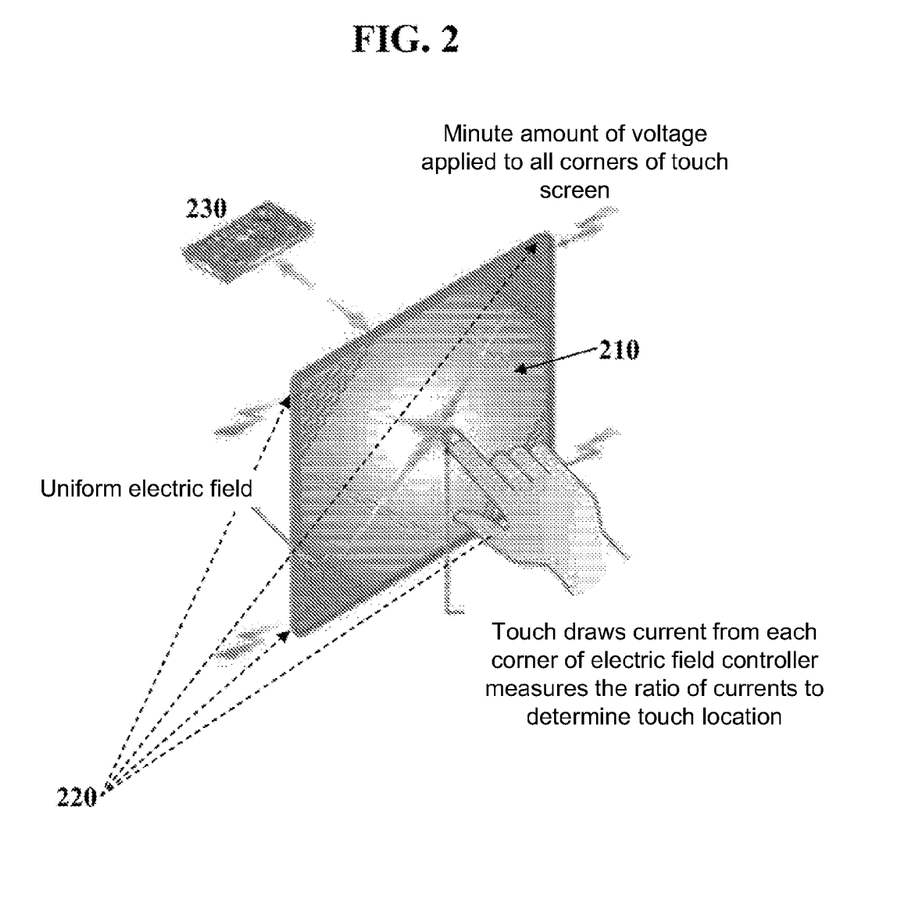
FIG. 2 is a schematic representation of a capacitive touch screen display.

Referring to FIG. 2, a capacitive touch screen display comprises a glass substrate covered by a transparent conductive layer 210 that stores electrical charge, and circuits 220 (e.g., in the four corners of the display) capable of detecting changes in capacitance. During operation, when a user touches the display, e.g., by making contact with the transparent conductive layer, a charge is transferred to the user from the display, and the overall charge on the capacitive transparent conductive layer 210 decreases. This decrease is detected by the aforementioned circuits 220 located in the display, allowing a computer 230 to calculate the point of contact.

As with the resistive touch screen display, ITO is both commonly used and mechanically inadequate as the transparent conductive layer in capacitive touch screen displays.

Figure 3:
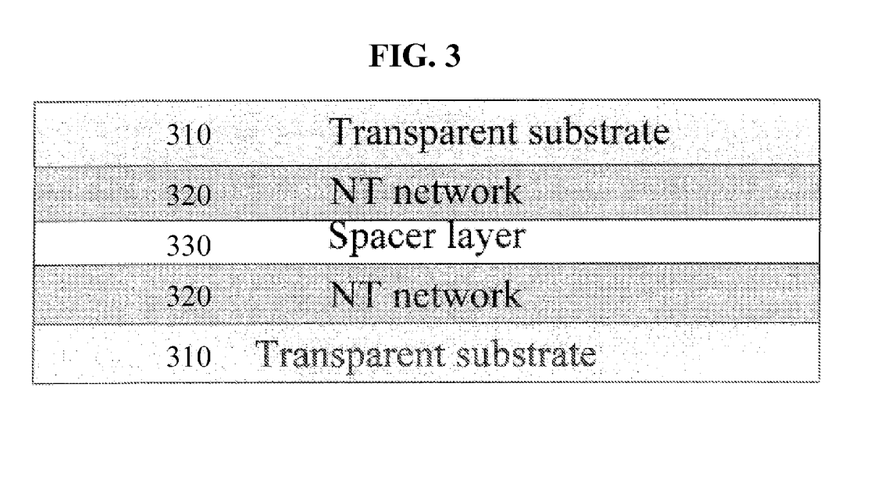
FIG. 3 is a basic architecture for a multilayer nanostructure device according to an embodiment of the present invention.

Therefore, referring to FIG. 3, a touch screen display according to an embodiment of the present invention comprises a multilayer structure having at least one nanostructure-film as a transparent conductive layer.

Nanostructure-films include, but are not limited to, those comprising nanotubes, nanowires, nanoparticles and graphene flakes. In general, nanostructure-films are chemically resistant and can function in a wide range of different temperatures. Therefore, unlike the touch screen architectures described in the prior art, the touch screen architecture in the present invention may be comprised of nearly any appropriate spacer material. Additionally, the nanostructure-films usually have low ambient reflections, which will reduce the glare of the assembled devices.

In a preferred embodiment of the present invention, the nanostructure-films comprise substantially single-walled carbon nanotubes (SWNTs) given that such nanotubes have not only high mechanical strength, but also high electrical conductivity. Transparent conducting films composed of randomly distributed SWNTs have been demonstrated as having better mechanical properties than ITO. As used herein, "substantially" shall mean that at least 40% of components are of a given type.

In a first embodiment, a transparent substrate 310 may be coated with a network of nanotubes 320 to form a nanotube-coated transparent substrate. A multilayer device may be fabricated by sandwiching a spacer layer 330 (e.g., comprising an array of insulating micro-sphere spacers) between opposing layers of such nanotube-coated transparent substrates, such that the conductive layers are facing each other. This device may function as a resistive touch screen display, wherein current runs through the networks of nanotubes 320, and user-contact with the device is detected when such contact induces deformation sufficient to bring the networks of nanotubes 320 into contact with each other.

The transparent substrate 310 may comprise, for example, polyethylene terephthalate (PET), polyethylene naphthalate (PEN), polycarbonate (PC), polyethersulfone (PES) and/or Arton. The transparent substrate may further be coated with, for example, a hardcoat (clear and/or anti-glare), an anti-reflection coating, and/or an anti-Newton ring coating.

Figure 4:
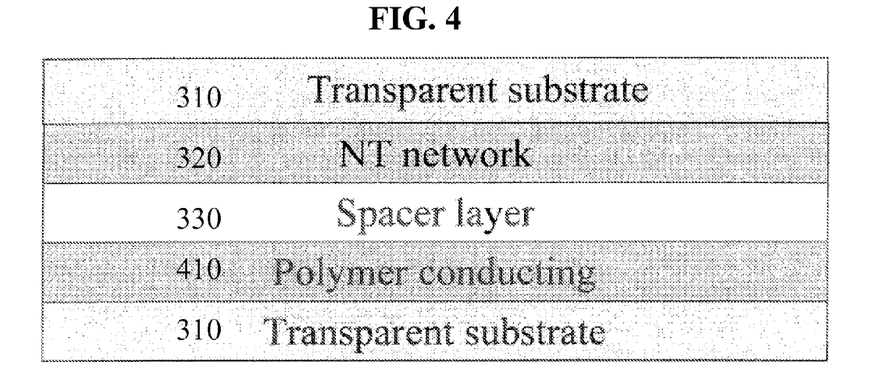
FIG. 4 is an alternate architecture for a multilayer nanostructure device according to an embodiment of the present invention.

Referring to FIG. 4, a resistive touch screen device may also be fabricated by sandwiching a spacer layer 330 between a nanotube-coated substrate (as described above) and an opposing transparent substrate 310 coated with another conducting layer, such as a conducting polymer 410. The device may further comprise a film forming binder, wherein the conductive polymer provides the necessary electrical conductivity, while the binder provides the desirable mechanical properties. The conducting polymer may be, for example, PEDOT. Additionally or alternatively, a network of nanostructures may be combined with a conducting polymer(s) to form a composite layer.

The scope of the present invention also extends to use of nanostructure-film(s) in the device architectures shown in FIG. 1 (e.g., in place of "ITO") and FIG. 2 as transparent conductive layer(s). For example, nanostructure-films may also be used as a transparent conductive layer in capacitive touch screen devices. Such devices have a very simple construction, wherein a nanostructure-film (e.g., SWNTs) is merely deposited as a thin layer coating the transparent substrate (e.g., glass). The nanostructure-films may be patterned or unpatterned.

Figure 5:
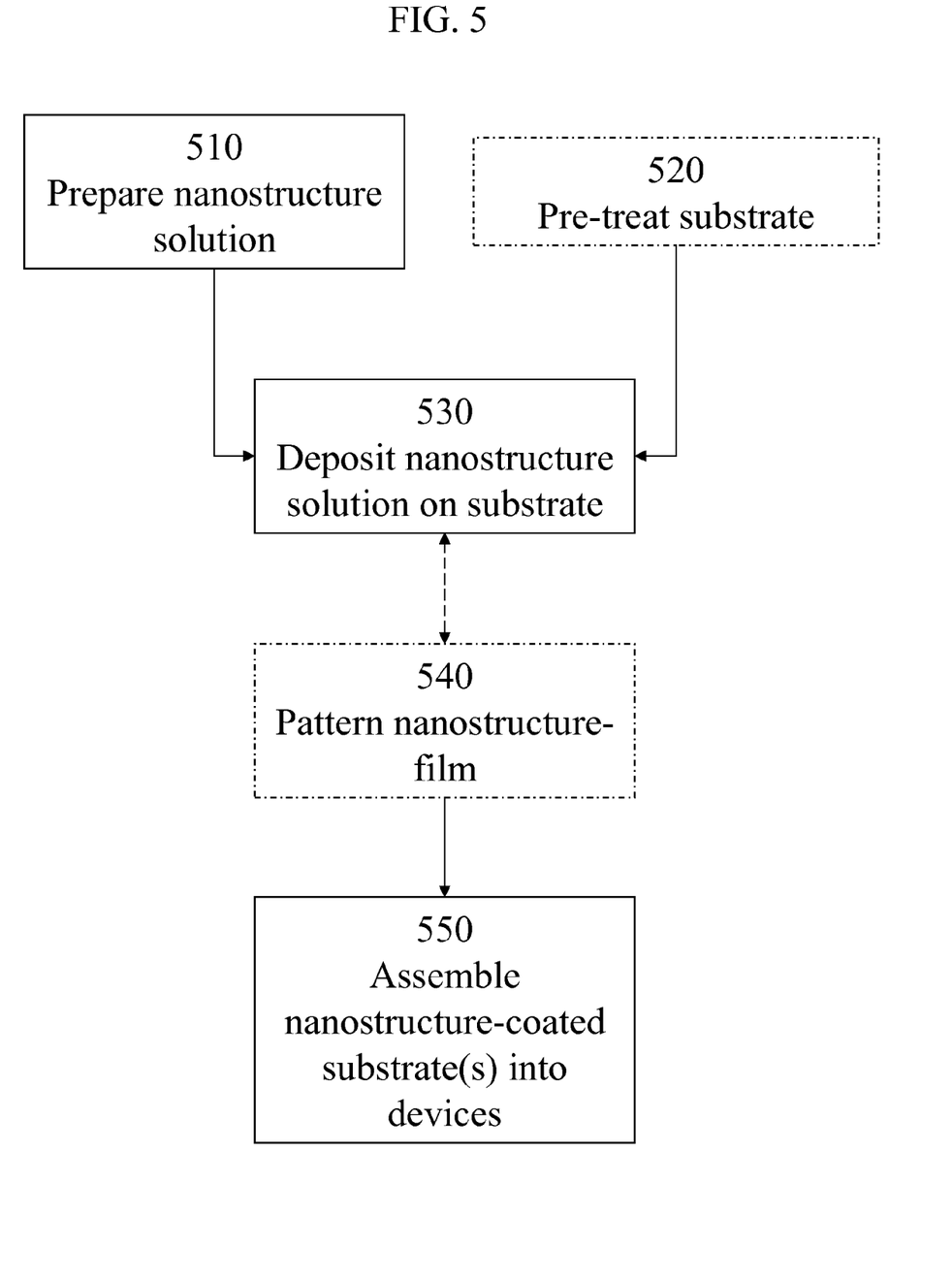
FIG. 5 is a flow chart showing a method of fabricating a multilayer nanostructure device according to an embodiment of the present invention.

Referring to FIG. 5, a method for fabricating a touch screen device according to an embodiment of the present invention begins with fabricating a nanostructure solution and then depositing it onto a transparent substrate. Nanostructures may be deposited on a substrate through a variety of techniques such as, for example, spraying, drop-casting, dip-coating, inkjet and transfer printing. Some of these deposition methods are described in PCT Application No. US/2005/047315, filed Dec. 27, 2005, and entitled "COMPONENTS AND DEVICES FORMED USING NANOSCALE MATERIALS AND METHODS OF PRODUCTION," which is herein incorporated by reference.

In an exemplary fabrication process, a SWNT film is deposited onto a transparent substrate 530 via a multi-step spray and wash process.

Prior to spraying, a nanostructure solution is prepared 510. For example, commercially available SWNT powder may be dissolved in water with 1% SDS, and then probe sonicated for 30 minutes at 300 W power. The solution is then centrifuged at 10 k ref for 1 hour.

Also prior to spraying, the substrate may be pre-treated 520 so as to enable the nanostructures to better stick to it. For example, the substrate can be immersed and soaked in a silane solution (1% weight of 3-aminopropyltriethoxysilane in water) for approximately five minutes, followed by rinsing with DI water and blow drying using nitrogen.

The substrate may subsequently be sprayed with a nanostructure film. In an exemplary process, SWNTs are sprayed onto a polycarbonate substrate (Tekra 0.03" thick with hard coating). After one spray, the substrate is immersed in DI water (room temperature) or Methanol for 1 minute, then is sprayed again, and immersed in water. The process of spraying and immersing in water is repeated multiple times until the desired sheet resistance is achieved. During the spray, the substrate is placed on a hot plate at a temperature suitable to facilitate the evaporation of water (e.g., 100° C.).

Nanostructure-films (e.g., SWNT-films fabricated using the method above) may be patterned 540, either before, after or during deposition onto the substrate. Such patterning may be accomplished by, for example, photolithography and etching, lift-off methods (e.g., using a photoresist coating), PDMS transfer stamping and/or printing (e.g., inkjet). In an embodiment according to the present invention, a SWNT-film was patterned down to about five microns without any change in sheet resistance and transparency.

In an exemplary process, photoresist (PR) 5214 is spin coated onto the sprayed films on glass or PET substrates at a speed of 3000 rpm with a ramp of 500 rpm. After photo exposure through a mask, PR is selectively removed by soaking in developer. Oxygen plasma with reactive ion etcher (RIE) system (100 W rf power and 2 minutes etching) removes SWNTs from unprotected areas. The PR is then removed by soaking the substrate in acetone for 5-10 minutes. Finally, the films are rinsed by water and blown to dry with nitrogen.

Whether patterned or not, the resulting nanostructure-coated substrate may be subsequently assembled into, for example, resistive and/or capacitive touch screen devices 550. In a resistive touch screen, opposing layers of the nanostructure-coated substrate may, for example, be sandwiched together with a spacer layer separating them such that the nanostructure-films face each other. In a capacitive touch screen, a SWNT-coated substrate may be affixed to circuits and a computer, whereby changes in capacitance across the film can be detected. Additional coating layers may be applied to, for example, optimize optical transmission and/or package the device.

Figure 6:
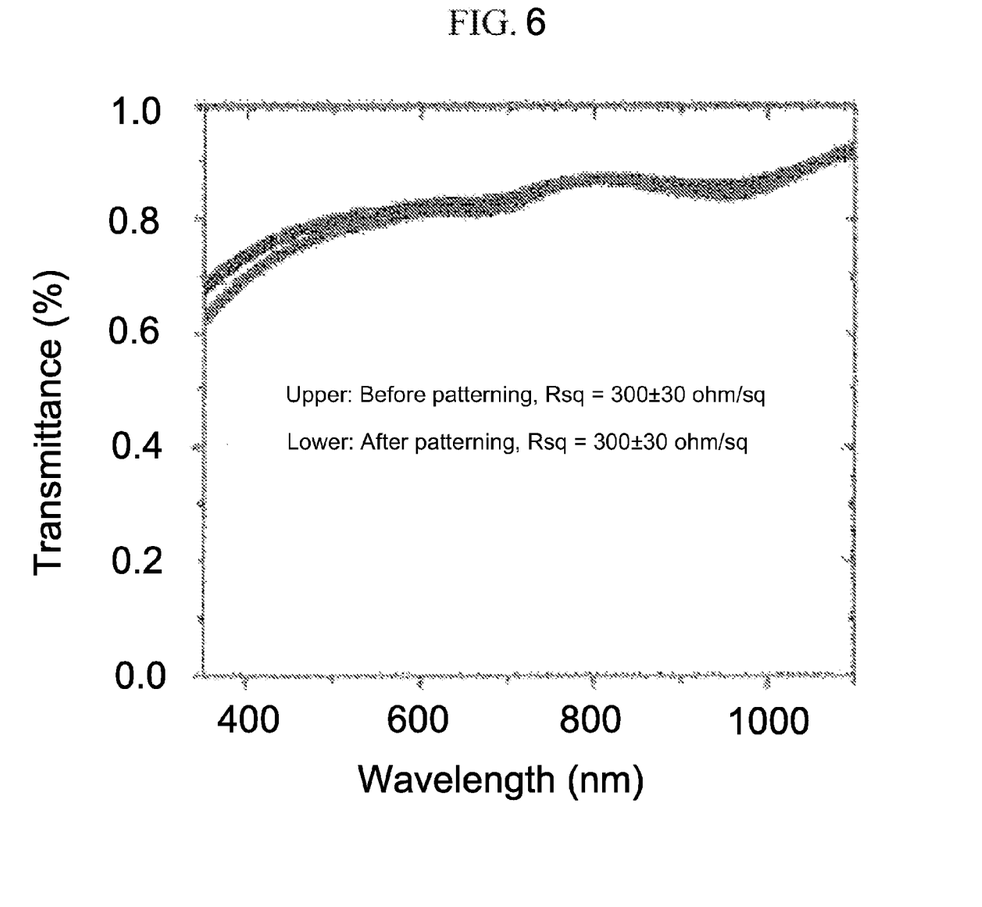
FIG. 6 shows the transmittance of a nanostructure-film according to an embodiment of the present invention, both before and after patterning.
Figure 7:
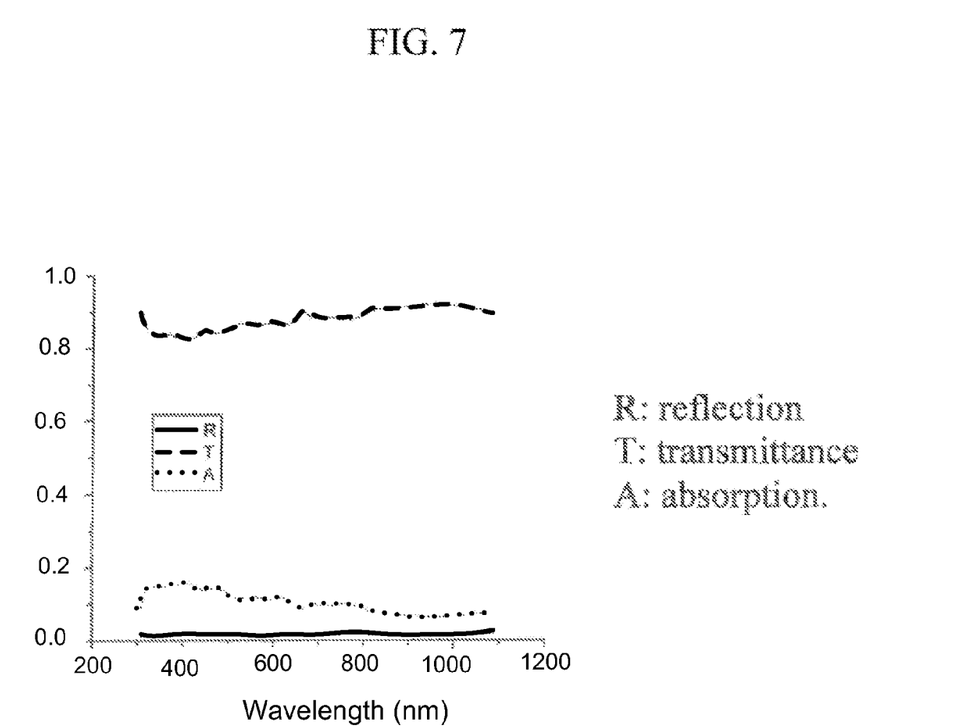
FIG. 7 is a plot of reflectance, absorbance and transmittance versus wavelength, wherein the top line is transmittance, the middle line is absorption, and the bottom line is reflection.

Referring to FIG. 6, an exemplary nanostructure-film according to an embodiment of the present invention displayed relatively similar transmittance before and after patterning (e.g., with patterns of about five microns). Additionally, referring to FIG. 7, such a film displayed low ambient reflection, which can serve to reduce glare in the assembled touch screen devices.

Figure 8:
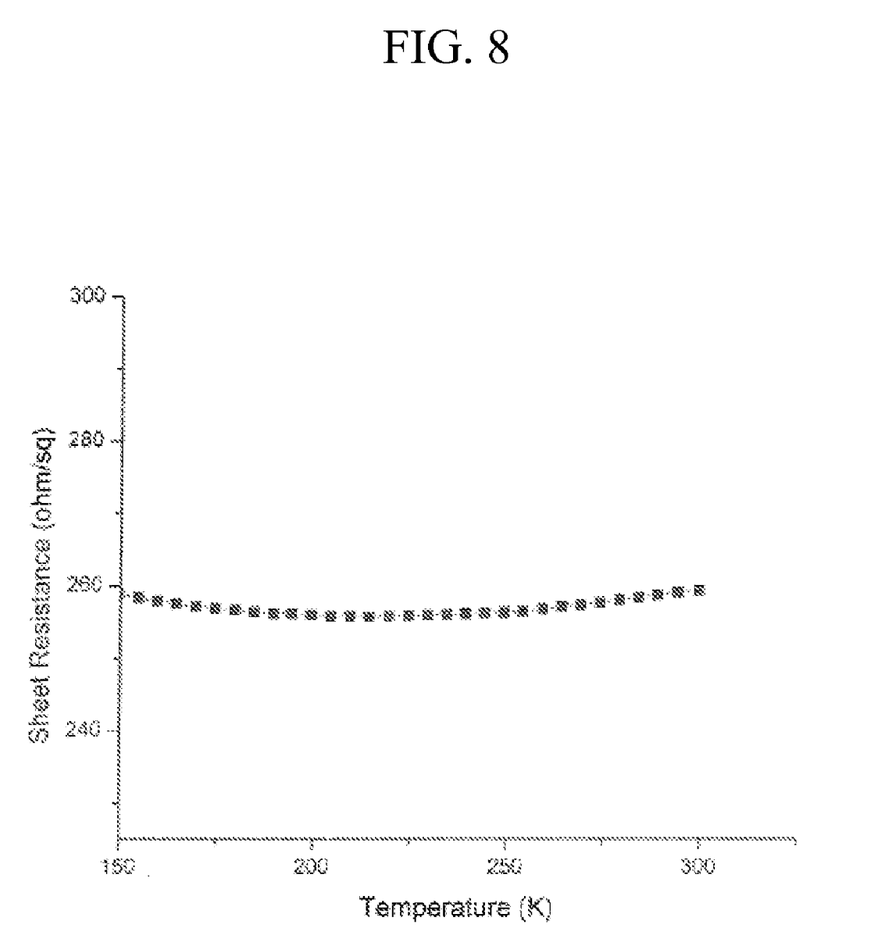
FIG. 8 is a plot of sheet resistance versus temperature.

Referring to FIG. 8, another exemplary nanostructure-film according to an embodiment of the present invention was shown to be chemically resistant and able to function in a wide-range of different temperatures (e.g., displaying a sheet resistance of about 250 ohm/sq in the 150 to 300 K range). Thus, unlike typical conventional touch screen architectures, many devices according to the present invention can be comprised of nearly any appropriate spacer material.

The present invention has been described above with reference to preferred features and embodiments. Those skilled in the art will recognize, however, that changes and modifications may be made in these preferred embodiments without departing from the scope of the present invention. These and various other adaptations and combinations of the embodiments disclosed are within the scope of the invention.

What is claimed is:

1. A multilayer device, comprising:
    a spacer layer on a first transparent substrate;
    a first transparent conductive layer between the spacer layer and the first transparent substrate, the first transparent conductive layer including a network of nanostructures directly contacting the spacer layer and the first transparent substrate; and
    at least two circuits, wherein
    the first transparent conductive layer stores an electric charge, and
    the circuits detect changes in capacitance across the first transparent conductive layer when the first transparent conductive layer is directly contacted by an external capacitance field.

2. The device of claim 1, further comprising:
    a second conductive layer on a second substrate,
    wherein the first transparent conductive layer and the second conductive layer face each other and are separated by the spacer layer,
    wherein at least one of the first substrate and the second substrate is flexible, and
    wherein the spacer layer prevents contact between the first transparent conductive layer and the second conductive layer in the absence of external deformation.

3. The device of claim 2, wherein nanostructures of the first network of nanostructures are substantially single-walled carbon nanotubes.

4. The device of claim 3, wherein the first transparent conductive layer further comprises a conducting polymer.

5. The device of claim 4, wherein at least one of the first transparent conductive layer and the second conductive layer is patterned.

6. The device of claim 5, wherein the second conductive layer comprises a second network of nano structures.

7. The device of claim 1, wherein the first transparent conductive layer has a sheet resistance of less than 500 ohm/sq and a transmittance of at least 90% for 550 nm wavelength light.

8. The device of claim 1, wherein the first transparent conductive layer has a sheet resistance of less than 350 ohm/sq and a transmittance of at least 90% for 550 nm wavelength light.

9. The device of claim 1, wherein the first transparent conductive layer has a sheet resistance of less than 200 ohm/sq and a transmittance of at least 90% for 550 nm wavelength light.

10. The device of claim 1, wherein the network of nanostructures is a single layer.

11. A method of fabricating a multi-layer device, comprising:
   depositing a first conductive layer on a first substrate,
   depositing a second conductive layer on a second substrate; and
   affixing the first substrate to the second substrate such that the first conductive layer faces the second conductive layer,
   wherein the first conductive layer is deposited by a multi-step spraying and washing process, comprising,
      spraying nanostructures in solution onto the first substrate;
      washing the first substrate after spraying, and
      repeating the spraying and washing until a nanostructure-film of desired thickness is achieved,
   wherein the first substrate is heated during the spraying process,
   wherein a spacer layer prevents contact between the first and second conductive layers in the absence of external deformation,
   wherein at least one of the first and second substrates is flexible,
   wherein the first conductive layer comprises a first network of nanostructures, and
   wherein the first network of nanostructures directly contacts the spacer layer and the first substrate.

12. The method of claim 11, wherein nanostructures of the first network of nanostructures are substantially single-walled carbon nanotubes.

13. The method of claim 12, further comprising depositing a conducting polymer that substantially fills open porosity in the first conductive layer.

14. The method of claim 13, wherein the second conductive layer comprises a second network of nanostructures, and wherein at least one of the first network of nanostructures and the second network of nanostructures is patterned.

15. The method of claim 11, wherein the first conductive layer is deposited by transfer stamping.

16. The device of claim 11, wherein the first network of nanostructures is a single layer.

17. A touch screen comprising:
   a first network of substantially single-walled carbon nanotubes (SWNTs) deposited directly on a first substrate,
   wherein both the first network of SWNTs and the first substrate are transparent and the first network of substantially single-walled carbon nanotubes (SWNTs) are configured to directly contact a spacer layer;
   a second network of substantially SWNTs deposited on a second substrate, wherein the first and second networks of substantially SWNTs face each other and are separated by the spacer layer,
   wherein the spacer layer prevents contact between the first and second networks of substantially SWNTs in the absence of external deformation,
   wherein at least one of the first and second substrates is flexible,
   wherein the first network of substantially single-walled carbon nanotubes (SWNTs) directly contacts the spacer layer,
   wherein at least one of the first and second networks of substantially SWNTs has a sheet resistance of less than 500 ohm/sq and a transmittance of at least 90% for 550 nm wavelength light, and
   wherein capacitance across the first network of substantially single-walled carbon nanotubes is changed when the first network of substantially single-walled carbon nanotubes is directly contacted by an external capacitance field.

18. The touch screen of claim 17, wherein at least one of the first and second networks of substantially SWNTs has a conductivity of at least 1000 S/cm.

19. The touch screen of claim 17, wherein the first network of substantially single-walled carbon nanotubes (SWNTs) is a single layer.

* * * * *